United States Patent
Hirose (10) Patent No.: US 7,908,124 B2
(45) Date of Patent: Mar. 15, 2011

(54) DESIGNING SYSTEM OF DC SUPERCONDUCTING CABLE

(75) Inventor: Masayuki Hirose, Osaka (JP)

(73) Assignee: Sumitomo Electric Industries, Ltd., Osaka-shi, Osaka (JP)

(*) Notice: Subject to any disclaimer, the term of this patent is extended or adjusted under 35 U.S.C. 154(b) by 942 days.

(21) Appl. No.: 11/791,616

(22) PCT Filed: Oct. 28, 2005

(86) PCT No.: PCT/JP2005/019858
§ 371 (c)(1),
(2), (4) Date: May 25, 2007

(87) PCT Pub. No.: WO2006/061960
PCT Pub. Date: Jun. 15, 2006

(65) Prior Publication Data
US 2008/0167845 A1    Jul. 10, 2008

(30) Foreign Application Priority Data
Dec. 6, 2004  (JP) .................................. 2004-353421

(51) Int. Cl.
*G06F 17/50* (2006.01)
(52) U.S. Cl. ........................................................ 703/1
(58) Field of Classification Search ........ 703/1; 29/599; 174/125.1
See application file for complete search history.

(56) References Cited

U.S. PATENT DOCUMENTS

| | | | | |
|---|---|---|---|---|
| 4,003,762 A * | 1/1977 | Ceresara et al. | ................ | 148/98 |
| 4,377,905 A * | 3/1983 | Agatsuma et al. | ............. | 29/599 |
| 5,932,523 A | 8/1999 | Fujikami et al. | | |
| 5,952,614 A | 9/1999 | Ries | | |
| 6,215,072 B1 * | 4/2001 | Fujikami et al. | ............ | 174/125.1 |
| 6,534,718 B1 * | 3/2003 | Pourrahimi et al. | ........ | 174/125.1 |
| 2002/0027014 A1 * | 3/2002 | Mukoyama et al. | ........ | 174/125.1 |
| 2004/0026117 A1 * | 2/2004 | Reese et al. | ................ | 174/125.1 |
| 2004/0122638 A1 * | 6/2004 | Niemann et al. | ................... | 703/2 |
| 2004/0200637 A1 * | 10/2004 | Yumura et al. | ............. | 174/125.1 |

FOREIGN PATENT DOCUMENTS

| | | |
|---|---|---|
| JP | 2002-140944 | 5/2002 |
| JP | 2002-537632 | 11/2002 |
| JP | 2003-187651 | 7/2003 |
| JP | 2003-249130 | 9/2003 |
| RU | 2 099 806 C1 | 12/1997 |
| RU | 2 231 149 C2 | 6/2004 |

* cited by examiner

*Primary Examiner* — Jeffrey Pwu
*Assistant Examiner* — Scott M Sciacca
(74) *Attorney, Agent, or Firm* — Drinker Biddle & Reath LLP (57) ABSTRACT

Provided is a designing system for designing a DC superconducting cable comprising a conductor layer and an outer-conductor layer arranged outside the conductor layer through an electrical insulation layer, the designing system comprising:
First correlation-calculation means for calculating the relationship between a ratio Xf and a contraction amount Cf, the ratio Xf being a ratio between the winding diameter and the winding pitch of a superconducting wire constituting the conductor layer, and the contraction amount Cf being capable of absorbing the thermal contraction of the superconducting wire due to cooling; Second correlation-calculation means for calculating the relationship between the ratio Xf and a use quantity ratio Ufx of the superconducting wire in the conductor layer per unit length of the cable; and First selection means for extracting, from the calculation results of First correlation-calculation means and Second correlation-calculation means, data of the winding diameter and the winding pitch of the superconducting wire, the data enabling satisfying a given contraction amount Cfs and the use quantity ratio Ufxs of the superconducting wire.

5 Claims, 7 Drawing Sheets

DESIGNING SYSTEM OF DC SUPERCONDUCTING CABLE

TECHNICAL FIELD

The present invention relates to a designing system of a direct current (DC) superconducting cable.

BACKGROUND ART

Figure 8:
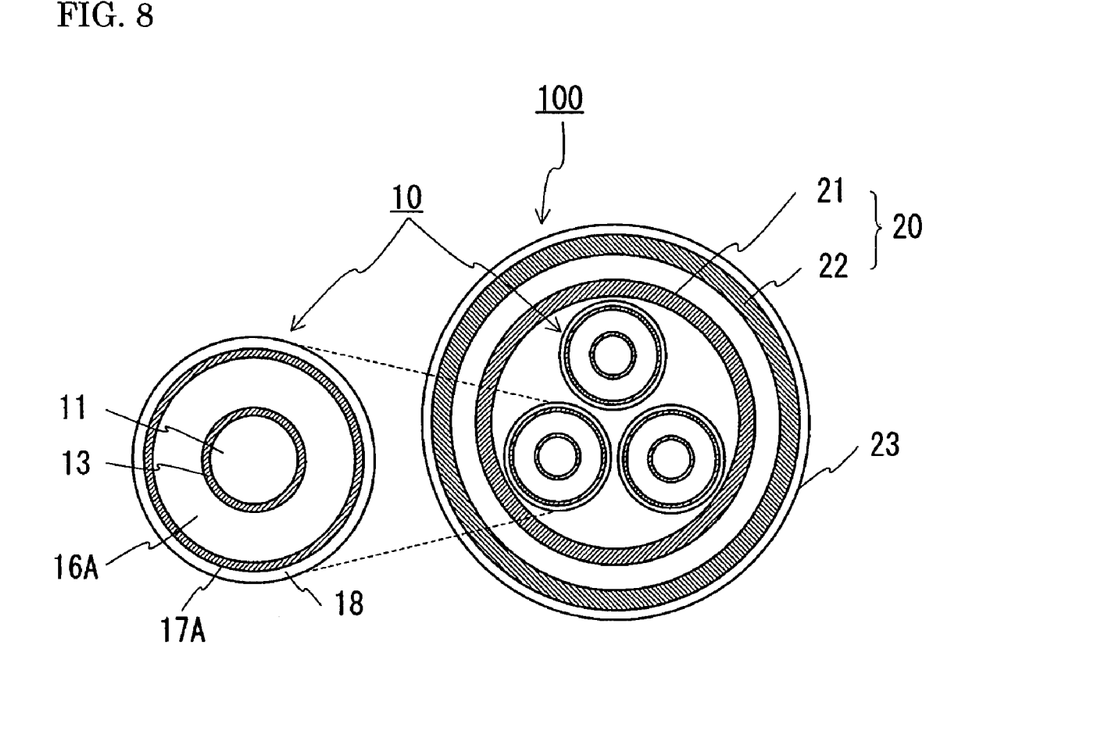
FIG. 8 is the cross sections of a superconducting cable designed by a conventional designing method.

As a superconducting cable, the superconducting cable 100 shown in FIG. 8 is proposed, which is structured such that three cable cores 10 are housed in a thermal insulation pipe 20 (See, for example, Patent documents 1 and 2).

The cable core 10 includes a former 11, a conductor layer 13, an electrical insulation layer 16A, a shielding layer (outer-conductor layer) 17A, and a protective layer 18 in the enumerated order from the center. The conductor layer 13 is formed by spirally winding superconducting wires in multiple layers around the former 11. Generally, the superconducting wire has a tape-shaped structure in which a plurality of filaments consisting of oxide superconducting material are arranged in a matrix of a silver sheath or the like. The electrical insulation layer 16A is formed by winding an insulation paper. The shielding layer 17A is formed by spirally winding a superconducting wire around the electrical insulation layer 16A as in the case of the conductor layer 13. An insulation paper or the like is used for the protective layer 18.

The thermal insulation pipe 20 is structured such that a thermal insulation material (not illustrated) is arranged between the double pipes consisting of an inner pipe 21 and an outer pipe 22 and the space between the double pipes is evacuated. An anticorrosion layer 23 is formed around the outside of the thermal insulation pipe 20. The thermal insulation pipe 20 is prepared for a usable condition by filling and circulating a coolant of liquid-nitrogen or the like in the spaces formed inside the former 11 (in the case where it has a hollow structure) as well as between the inner pipe 21 and the cores 10 such that the electrical insulation layer 13 is impregnated with the coolant.

The structure of such a superconducting cable is studied mainly as an alternating current (AC) cable. In such case, it is proposed that for the purpose of reducing AC loss, the winding pitch and winding direction of a superconducting wire in each layer be individually adjusted in order to enable an equivalent current to flow through the respective layers which constitute a conductor layer and a shielding layer. Also, for the purpose of reducing the amount of superconducting wires to be used, generally a comparatively large value is chosen as a winding pitch of the superconducting wires.

[Patent document 1] Japanese Patent Application Publication No. 2003-249130 (FIG. 1)

[Patent document 2] Japanese Patent Application Publication No. 2002-140944 (FIG. 2)

DISCLOSURE OF THE INVENTION

Problems to be Solved by the Invention

However, the following problems have existed with respect to the above-mentioned designing technique of superconducting cable.

(1) The technique is not clear as to how to determine the structure of a DC superconducting cable. In the case of the DC cable, unlike an AC cable, there is no problem in terms of equivalent current flow in conductor layers, and therefore it is unnecessary to individually specify the winding pitch of a superconducting wire in each layer which comprises a conductor layer and a shielding layer. However, no concrete standard is defined as to what winding pitch should be adopted in a specific winding diameter in order to form a conductor layer and an outer-conductor layer.

(2) No clear technique is found for designing a structure to absorb the contraction of superconducting wires. In a superconducting cable, it is necessary to enable its structure to absorb the contraction of superconducting wires which occurs due to cooling made by a coolant at cryogenic temperature during operation. However, as for the mechanism that enables absorbing the contraction, no designing technique for achieving a simple composition suitable for a DC superconducting cable has been found.

In the case of a structure including three cable cores, the contraction can be absorbed by such measures as affording flexure to the twist of these cores. However, in the case of a single-core superconducting cable, such measure cannot be adopted. Therefore, it is conceivable to allow the superconducting wires to suffer from the stress due to contraction generated by cooling, or to adopt such a measure as to enable the terminal part of a superconducting cable to slide according to the thermal contraction of the cable.

However, in the former case, as a result of significant tension caused to the superconducting wires for allowing the effect of stress due to the contraction of superconducting wires, the superconducting wires might be deteriorated depending on the level of the stress, or the thermal insulation performance of the thermal insulation pipe might be degraded as a result of lateral pressure applied at the curved part of the cable according to the contraction of the cable. In the case of the latter, it is necessary to provide a mechanism for the terminal of the superconducting cable to slide, and accordingly a large-scale measure is likely to be required against the contraction problem.

The main object of the present invention, which is made in view of the above-mentioned problems, is to provide a designing system for designing a DC superconducting cable in which the contraction of superconducting wires due to cooling can be absorbed and in which the quantity of the superconducting wires to be used can be reduced as much as possible.

Means for Solving the Problems to be Solved

The above-mentioned object can be achieved by the designing system of the present invention, according to which not only can the cable core itself have a mechanism for countermeasure against the thermal contraction of superconducting layers (i.e., a conductor layer and an outer-conductor layer) but also the use quantity of the superconducting wires to be used in the superconducting cable can be taken into consideration in designing a DC superconducting cable.

The designing system of the present invention is a system for designing such DC superconducting cable comprising a conductor layer and an outer-conductor layer arranged outside the conductor layer through an electrical insulation layer. In the designing system, values of a winding diameter and a winding pitch of the superconducting wires constituting the conductor layer and the outer-conductor layer are obtained by calculation for designing the DC superconducting cable. The designing system has the following compositions:

a: First correlation-calculation means for calculating the relationship between a ratio $X_f$, which is a ratio between a winding diameter and a winding pitch of the superconducting wires constituting the conductor layer, and a contraction amount Cf; which absorbs the thermal contraction of the superconducting wires due to cooling;

b: Second correlation-calculation means for calculating the relationship between the ratio Xf and a use quantity ratio Ufx of the superconducting wires in the conductor layer per unit length of the cable; and c: First selection means for extracting, from the calculation results of First correlation-calculation means and Second correlation-calculation means, the data of the winding diameter and the winding pitch of the superconducting wires which will satisfy a given contraction amount Cfs and the use quantity ratio Ufx of the superconducting wires.

According to the above-mentioned system, a superconducting cable can be designed such that a stress relaxation layer for absorbing the contraction due to the thermal contraction of the superconducting wire is formed on the inner side of the superconducting wires so that the superconducting wires do not suffer from excessive tension. In such system, in order to increase the degree of freedom in designing the stress relaxation layer, the winding diameter and the winding pitch of superconducting wires with which the contraction amount may be lessened can be selected from the calculation results of First correlation-calculation means. Likewise, it is possible to select the winding diameter and the winding pitch of the superconducting wires after the decreasing of the outer diameter of the cable and the lessening of the use quantity of the superconducting wires are taken into account on the basis of the calculation results of Second correlation-calculation means. Then, by means of First selection means, the upper limit of the winding pitch with which the contraction amount can substantially be decreased and the lower limit of the winding pitch with which the use quantity of the superconducting wires may not substantially be increased are extracted, and thereby it is made possible to obtain data regarding the winding diameter and winding pitch of superconducting wires which are suitable for a DC superconducting cable.

Likewise, not limited to the case of the conductor layer but also in the case where the superconducting cable has an outer-conductor layer, by adopting a similar way of approach with respect to the outer-conductor layer, it is possible to extract a winding diameter and a winding pitch that are preferable in terms of the use quantity of superconducting wires and the contraction amount to occur due to cooling.

Hereinafter, the outline of a superconducting cable designed by the system will be described before an explanation of the designing system of the present invention.

This superconducting cable is generally composed of a cable core and a thermal insulation pipe for housing the cable core. The cable core basically has a structure typically comprising a former, a stress relaxation layer, a conductor layer, an electrical insulation layer, and a protective layer in the enumerated order from the center. Besides, an outer-conductor layer may be provided between the electrical insulation layer and the protective layer, and a lapped-holding layer and a cushion layer may be provided outside the conductor layer and the outer-conductor layer.

First, as for the above-mentioned constituent members, various known kinds of materials and compositions can be used with respect to the former, the conductor layer, the electrical insulation layer, the outer-conductor layer, the protective layer, and the thermal insulation pipe. As to the conductor layer and the outer-conductor layer, by choosing such winding diameter and winding pitch of the superconducting wires as extracted by the present invention system, it is made possible to cause the cable core itself to effectively absorb the thermal contraction of the superconducting wires at the time of cooling and to decrease the use quantity of the superconducting wires.

Next, the stress relaxation layer is a layer for absorbing the thermal contraction of a superconducting layer. The superconducting layer, which is formed by winding a superconducting wire spirally, is a conductor layer or an outer-conductor layer (a shielding layer). The superconducting layer is cooled to cryogenic temperature by a coolant in the cable operation, and consequently undergoes thermal contraction. The contraction also occurs in the radial direction, accompanying the thermal contraction of the superconducting wire, and therefore the stress relaxation layer which is provided inside the superconducting layer contracts corresponding to the thermal contraction of the superconducting wire, whereby the effect of excessive tension is restrained from acting on the superconducting wire.

When placed under cryogenic temperature by the coolant, the stress relaxation layer should preferably have a contraction amount capable of absorbing at least a part of the radial contraction of the superconducting layer. In other words, the cable core may be structured such that the radial contraction of the superconducting layer which accompanies cooling may be absorbed by the stress relaxation layer and the other cable constituent member provided inside the stress relaxation layer. Or, it may be structured such that only the stress relaxation layer absorbs the radial contraction of the superconducting layer due to the cooling.

In the former case, the stress relaxation layer itself can be made thinner since the contraction of the superconducting layer is absorbed by the contraction of both the stress relaxation layer and the cable constituent member. A former is a representative example of the cable constituent members provided inside the stress relaxation layer. In the latter case, since the absorption of the radial contraction of the superconducting layer can all be performed by the stress relaxation layer, it is possible to freely select the material and structure of the constituent member, e.g., a former, provided inside the stress relaxation layer.

The stress relaxation layer is arranged inside a superconducting layer. For example, it may be provided as an inner stress-relaxation layer inside the conductor layer (outside the former). Likewise, it may be provided as an outer stress-relaxation layer inside the outer-conductor layer (shielding layer). The stress relaxation layer to be provided inside the outer-conductor layer may be an electrical insulation layer itself or may be formed separately as a stress relaxation layer in addition to the electrical insulation layer. If an electrical insulation layer itself is used as the outer stress-relaxation layer, it is possible to downsize the cable core since it is unnecessary to provide a stress relaxation layer independently in addition to the electrical insulation layer.

The suitable materials for this stress relaxation layer are, for example, a kraft paper, a plastic tape, and a compound tape made of kraft paper and plastic tape. A polyolefin tape, a polypropylene tape in particular, can preferably be used as the plastic tape. Generally, the kraft paper is available at low cost, although its contraction amount due to cooling is relatively small, and although the compound tape consisting of kraft paper and polypropylene is expensive, its contraction amount due to cooling is larger. Particularly, in the case of the compound tape, if the thickness of polypropylene is larger, a larger contraction amount can be obtained, and it is possible to form such a stress relaxation layer as enables the superconducting wire not to suffer from an excessive tension even if the contraction amount of the superconducting wire is large. Besides, of the kraft paper, a crepe kraft paper and a humidity-adjusted kraft paper are capable of exhibiting a large contraction amount. Thus, it may be advisable to form a stress relaxation layer by using these materials singularly or in combination such that the stress relaxation layer has a sufficient thickness for absorbing at least a part of the radial contraction amount of the superconducting wire.

Also, a semiconductive layer may be formed at least at one side of the outer and inner peripheries of the electrical insulation layer, that is, between the conductor layer and the electrical insulation layer, and between the electrical insulation layer and the shielding layer. For achieving the stability of electric performance, it is effective to form an inner semiconductive layer, i.e., the former case, and an outer semiconductive layer, i.e., the latter case.

It is preferable to provide an outer-conductor layer outside the above-mentioned electrical insulation layer. Particularly, the outer-conductor layer is a composition which is necessary for performing power transmission of a monopolar system. In the case of an AC superconducting cable, in order to reduce the AC loss of the superconducting wire, it is necessary to provide a shielding layer for shielding against the magnetic flux that leaks to the outer periphery of the conductor layer. Also, in the case of a DC superconducting cable, it is necessary to provide a return conductor by arranging an outer-conductor layer at the position equivalent to the position of the shielding layer of the AC superconducting cable. In other words, by providing the outer-conductor layer (return conductor) made of a superconducting wire outside the electrical insulation layer, the conductor layer can be used as an outward current flow path in the monopolar power transmission, and the return conductor can be used as the return current flow path. This outer-conductor layer must be structured so as to have the same electric current capacity as the conductor layer. With the superconducting cable structured in a multicore-bundled-in-one type form such that a plurality of cores are housed in the thermal insulation pipe, it is possible to adopt a unipolar power transmission method or a bipolar power transmission method. In the latter case, the outer-conductor layer has a function as a neutral line.

Besides, a lapped-holding layer may be formed outside a superconducting layer. Providing the lapped-holding layer outside the superconducting layer allows the superconducting layer to be tightened in an inward direction. By the tightening effect, it is made possible to make the radial contraction of the superconducting layer to occur smoothly. The material of the lapped-holding layer may be a material such as a metallic tape, for example, which is capable of affording the superconducting layer a given tightening force, and particularly a copper tape or the like can preferably be used.

In the case where the lapped-holding layer is used, it is preferable to provide a cushion layer between the lapped-holding layer and the superconducting layer. When a metallic tape is used for the lapped-holding layer, a superconducting wire may be damaged since the direct contact between the lapped-holding layer and the superconducting layer means a contact between metals, because generally the superconducting wire is made of a metal such as silver. Therefore, if a cushion layer is provided between the two layers, the direct contact between these metals can be avoided, whereby the damage of the superconducting wire can be prevented. The suitable material for the cushion layer is, for example, an insulation paper or carbon paper.

When designing such a cable, the winding diameter and the winding pitch suitable for forming the conductor layer and the outer-conductor layer are appropriately determined by means of the present invention system.

First correlation-calculation means calculates the relationship between the ratio $Xf$, which is a relation between the winding diameter and the winding pitch of a superconducting wire constituting a conductor layer, and the radial contraction amount $Cf$, which absorbs the thermal contraction of the superconducting wire due to cooling. The winding diameter of the conductor layer may be a value chosen with a suitable range. For example, it may be set at suitable intervals in the range of 20 to 40 mm. The winding pitch may be a value determined in terms of how many times the value of the winding diameter. This number of times may also be a value chosen with a suitable range. For example, it may be set at suitable intervals in the range of about 2 to 20 times. The radial contraction amount $Cf$, which absorbs the thermal contraction due to cooling of a superconducting wire, is a value obtained by seeking how much the superconducting wire which has been wound with a certain winding diameter and winding pitch will contract in a radial direction when it contracts in the longitudinal direction due to the cooling. The longitudinal contraction ratio of a superconducting wire can be obtained from the coefficient of linear expansion of the superconducting wire and the amount of temperature variation due to the cooling. The contraction in a radial direction, that is, the radial contraction amount can be calculated using the above-mentioned contraction ratio and the fact that when one pitch of a spirally arranged superconducting wire is spread, it can be expressed with a right-angled triangle, wherein the oblique line is the length L of the superconducting wire, the vertical line is the circumferential length $2\pi d$ of a winding diameter d, and the base line is the pitch P. When the superconducting wire contracts by the amount of the contraction ratio, the length of the superconducting wire after contraction becomes $L-\Delta L$, wherein the contraction amount is expressed by $\Delta L$, and therefore, the radial contraction amount $Cf$ is expressed by $(d-d')$, wherein $d'$ is the winding diameter after the contraction, assuming that the pitch P does not change in that case.

Second correlation-calculation means calculates the relationship between the ratio $Xf$ and the use quantity ratio $Ufx$ of the superconducting wire in the conductor layer per unit length of the cable. The use quantity ratio $Ufx$ of the superconducting wire in the conductor layer per unit length of the cable is not a value in which the necessary wire quantity $Sf$ determined by taking the line characteristics such as electric current capacity into consideration, but is a value in which consideration is given to the required quantity $fu$ of the wire which is actually needed for forming a conductor layer in a unit length of the cable. The necessary wire quantity $Sf$ is a wire use quantity (the number of a unit length of wires or the total length of wires) in the case where a superconducting wire that is needed to secure a predetermined electric current capacity is applied in a longitudinal direction on a chosen winding diameter.

Generally, a superconducting wire is a tape-shaped wire having a substantially rectangular section. Therefore, when a superconducting wire is spirally wound around the outer periphery of a certain winding diameter, there is a case where 2.5 layers of the wire, for example, achieves a sufficient wire quantity necessary for securing a predetermined electric current capacity. However, when the superconducting cable is actually designed, usually the remaining 0.5 layer is also arranged with a superconducting wire in order to form a conductor layer in a uniform shape. In such case, the superconducting wire used for the 0.5 layer is surplus in terms of the theoretical specification of the cable, but the use quantity $fu$ of the wire in actual use is calculated as 3 layers. Therefore, if the number of layers of the superconducting wire to be actually used is sought on the basis of the width, the thickness, and the winding diameter of one superconducting wire, the use quantity can be obtained from the correlation with the necessary wire quantity Sf in which the winding diameter and the winding pitch are parameters. Then, the use quantity ratio Ufx of the superconducting wire is expressed by the ratio fu/Sf between the necessary use quantity Sf and the actual wire use quantity fu.

On the other hand, based on the calculation result of the above First correlation-calculation means and Second correlation-calculation means, First selection means extracts the data of the winding diameter and the winding pitch of the superconducting wire which satisfy a predetermined radial contraction amount Cfs and the use quantity ratio Ufxs of the superconducting wire. The extracted data may be singular or plural. Based on this extraction, an appropriate winding diameter and a winding pitch can be extracted after the use quantity of the superconducting wire and the radial contraction amount which accompanies the contraction of the conductor layer are both taken into consideration. The predetermined radial contraction amount Cfs and the use quantity ratio Ufx may be appropriately set according to the requirements demanded of the superconducting cable.

Generally, the smaller the ratio of "winding pitch/winding diameter", the smaller the radial contraction amount can be made. In other words, if the winding diameter is constant, the radial contraction amount can be decreased as the winding pitch is smaller. Also, if the winding pitch is constant, the radial contraction amount can be decreased as the winding diameter is greater. On the other hand, the smaller the ratio of "winding pitch/winding diameter", the more the use quantity ratio Ufx of the superconducting wire increases. In other words, if the winding diameter is constant, the use quantity increases as the winding pitch is made smaller. Also, if the winding pitch is constant, the use quantity increases as the winding diameter is greater.

Therefore, if the priority is to be given to the securing of the radial contraction amount to be absorbed by the stress relaxation layer, a large use quantity ratio Ufx may be chosen by selecting a large radial contraction amount Cfs, and if the priority is to be given to decreasing the use quantity of the superconducting wire, the use quantity ratio Ufx may be made smaller by choosing a smaller radial contraction amount Cfs.

The above-mentioned method which is described regarding the conductor layer can be similarly applied to the case of the outer-conductor layer which is provided outside the conductor layer through an electrical insulation layer interposed between them. In other words, it is preferable to provide Third correlation-calculation means for calculating the relationship between the ratio Xg, which is the relationship between the winding diameter and the winding pitch of the outer-conductor layer, and the radial contraction amount Cg which will accompany the cooling of the superconducting wire, and Fourth correlation-calculation means for calculating the relationship between the ratio Xg and the use quantity ratio Ufg of the superconducting wire in the outer-conductor layer per unit length of the cable.

Third correlation calculation means calculates the relationship between the ratio Xg, which is a ratio between the winding diameter and the winding pitch of the outer-conductor layer, and the radial contraction amount Cg which absorbs the thermal contraction due to the cooling of the superconducting wire. The winding diameter of outer-conductor layer that is necessary for such calculation can be calculated from the winding diameter of the conductor layer, the thickness of the conductor layer, and the thickness of the electrical insulation layer. In other words, when a conductor layer is formed so as to secure an electric current capacity in the case of a winding diameter being set for the conductor layer, the thickness of the conductor layer can be calculated because the thickness of the superconducting wire is known. Also, the thickness of the electrical insulation layer can be determined by calculation based on the voltage and the insulation property of the insulation material of the superconducting cable, since the insulation should have a withstand voltage which is a line condition of the superconducting cable. Then, the winding diameter of the outer-conductor layer can be obtained by adding the thickness of the conductor layer and the thickness of the electrical insulation layer to the winding diameter of the conductor layer. The winding diameter of the outer-conductor layer may be calculated beforehand, and it may be input into the system of the present invention and may be used for the calculation in Third correlation-calculation means. Or, the system of the present invention may have the winding diameter calculation means for calculating the winding diameter of the outer-conductor layer.

Fourth correlation-calculation means calculates the relationship between the ratio Xg and the use quantity ratio Ufg of the superconducting wire in the outer-conductor layer per unit length of the cable. As in the case of the use quantity ratio Ufx in the conductor layer, the use quantity ratio Ufg is not a necessary wire quantity Sg obtained based on the line characteristics such as electric current capacity, etc., but is the value obtained by considering the wire quantity gu which is actually needed to form an outer-conductor layer in a unit length of the cable. The method of obtaining the ratio Ufg is gu/Sg, which is the same as in the case of the use quantity ratio Ufx. The electric current capacity of the outer-conductor layer is the same as that of the conductor layer.

Then, the data of the winding diameter and the winding pitch of the superconducting wire which satisfy the predetermined radial contraction amount Cgs and the use quantity ratio Ufgs of the superconducting wire are extracted by Second selection means from the calculation results of Third correlation-calculation means and Fourth correlation-calculation means. The predetermined radial contraction amount Cgs and the use quantity ratio Ufgs may be appropriately set according to the requirements which are demanded of the superconducting cable. The extraction thus conducted makes it possible to extract the appropriate winding diameter and the winding pitch after considering both the radial contraction amount which accompanies the contraction of the outer-conductor layer and the use quantity of the superconducting wire. The number of extracted data is singular or plural.

Preferably, the above-mentioned system of the present invention further includes Total use quantity calculation means and Third selection means. Total use quantity calculation means calculates a total use quantity ratio Utx=(fu+gu/Sf+Sg), which is the ratio between the total amount of the necessary wire quantity (St=Sf+Sg) and a total use quantity (fu+gu), wherein fu is the use quantity of superconducting wire in the conductor layer, and gu is the use quantity of the superconducting wire in the outer-conductor layer; and out of the data extracted with First selection means and Second selection means. Third selection means extracts the data in which the ratio Utx between the total use quantity Ut of the superconducting wire and the necessary wire quantity St of the superconducting wire that complies with the line conditions is equal to or less than a given value.

By extracting data in which Total use quantity ratio Utx of the superconducting wire is equal to or less than a given value, it is made possible to reduce, as much as possible, the quantity of the superconducting wire which might otherwise be used excessively for a surplus specification. The threshold of the ratio Utx may be a suitable value chosen depending on the expected reduction effect of the use quantity of the superconducting wire. It is noted that the more closely this ratio Utx approaches 1.0, the more reduced the use quantity of the superconducting wire is.

Also, it is preferable to provide Fourth selection means for extracting, out of the data extracted with First selection means and Second selection means, the data in which the number of layers in the conductor layer and the number of layers in the outer-conductor layer are equal to or less than the maximum number H, respectively.

The respective number of layers in the conductor layer and the outer-conductor layer is varied depending on the winding diameter of the superconducting wire. In such case, the maximum number of layers in the conductor layer and the maximum number of layers in the outer-conductor layer are respectively determined beforehand, and the data of the winding diameter and the winding pitch, with which the number of layers in the conductor layer and the number of layers in the outer-conductor layer will respectively become less than or equal to the predetermined maximum number of layers, are extracted out of the data extracted with First selection means and Second selection means. Thus, it is made possible to design a superconducting cable in which the thickness of the conductor layer and the outer-conductor layer is sufficiently thin to decrease the outer diameter.

Besides, it is preferable to provide Outer diameter calculation means for calculating the outer diameter of the outer-conductor layer in a cable which is designed using the data extracted with First selection means and Second selection means, and also to provide Fifth selection means for extracting, out of the data extracted with First selection means and Second selection means, the data in which the outer diameter of the outer-conductor layer is the minimum.

If the outer diameter of the outer-conductor layer is smaller, it is possible to accordingly decrease the outer diameter of the cable core, that is, the outer diameter of the superconducting cable itself. Thus, a superconducting cable having a small outer diameter can be designed with Fifth selection means.

Any of the above-mentioned Third selection means, Fourth selection means, and Fifth selection means may be used for the extraction of data, either independently or in combination of two or more of them.

ADVANTAGEOUS EFFECT OF THE INVENTION

According to the method of the present invention for designing a DC superconducting cable, the following effects can be obtained.

(1) According to the system of the present invention, it is possible to choose the values of the winding diameter and the winding pitch of a superconducting wire so that the radial contraction of a superconducting layer due to cooling may be a contraction amount which can easily be absorbed by the stress relaxation layer provided inside the superconducting layer.

(2) At the same time, it is possible to design a superconducting cable in which the use quantity of the superconducting wire is suppressed.

(3) By using Third correlation-calculation means and Fourth correlation-calculation means, and by making use of their calculation results, it is made possible to extract the winding diameter and the winding pitch with which the radial contraction amount of the superconducting wire is made suitable not only in the conductor layer but also in the outer-conductor layer.

(4) In addition, it is possible to design a superconducting cable in a manner such that the reduction of the use quantity of the superconducting wire is taken into account, not only with respect to the conductor layer alone, but also with respect to the total use quantity including the conductor layer and the outer-conductor layer.

(5) There may sometimes be a case in which a superconducting wire with surplus specification is used for the total use quantity of superconducting wires which constitute a superconducting layer, depending on the relationship between the winding diameter and the number of the layers; however, by providing Third selection means for extracting data in which the ratio Utx between the total use quantity tu=(fu+gu) of the superconducting wire and the necessary wire quantity St of the superconducting wire according to the line conditions is a value equal to or less than a given value, it is made possible to reduce the use quantity of the superconducting wire that corresponds to such surplus specification.

(6) With Fourth selection means, a superconducting cable in which the number of layers in the superconducting layer is equal to or less than the maximum number H of layers can be designed, and accordingly it is possible to design a superconducting cable having a small cable core diameter.

(7) With Fifth selection means, it is possible to design a superconducting cable having the minimum outer diameter of the outer-conductor layer, after taking the radial contraction amount and the use quantity of the superconducting wire into consideration.

DESCRIPTION OF REFERENCED NUMERALS 100 superconducting cable, 10 core, 11 former, 12 inner stress-relaxation layer, 13 conductor layer, 14A, 14B cushion layer, 13 conductor layer, 14A, 14B cushion layer, 15A, 15B lapped-holding layer, 16 electrical insulation layer and/or outside stress relaxation layer, 16A electrical insulation layer, 17 return conductor, 17A shielding layer, 18 protective layer, 20 thermal insulation pipe, 21 inner pipe, 22 outer pipe, 23 anticorrosion layer, 31 First correlation-calculation means, 32 Second correlation-calculation means, 33 First selection means, 41 Third correlation-calculation means, 42 Fourth correlation-calculation means, 43 Second selection means, 51 Total use quantity calculation means, 52 Third selection means, 61 Fourth selection means, 71 Outer diameter calculation means, 72 Fifth selection means

BEST MODE FOR CARRYING OUT THE INVENTION

Figure 1:
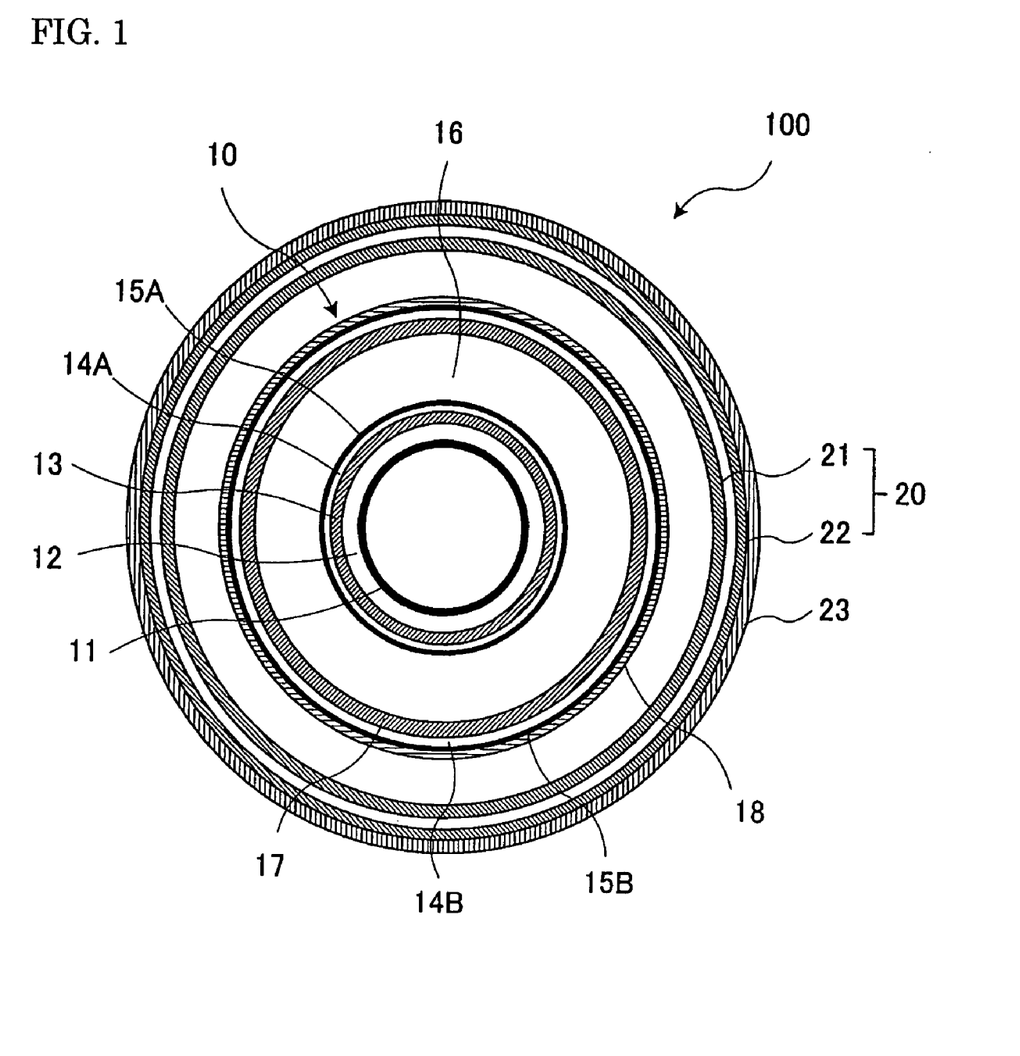
FIG. 1 is the cross section of a superconducting cable designed by a system of the present invention.

Hereinafter, an explanation of preferred embodiments of the present invention will be given based on FIG. 1 to FIG. 3. In the figure, the same mark indicates the identical part. The dimensional ratios of drawings are not always the same as those in the description.

[Superconducting Cable]

First, the outline of a superconducting cable designed with the system of the present invention will be described based on FIG. 1. This superconducting cable 100 comprises a single cable core 10 and a thermal insulation pipe 20 in which the core 10 is housed.

[Core]

The core 10 includes, in the enumerated order from the center, a former 11, an inner stress-relaxation layer 12, a conductor layer 13, a cushion layer 14A, a lapped-holding layer 15A, an electrical insulation layer (and outer stress relaxation layer) 16, an outer-conductor cushion layer 14B (return conductor 17), a lapped-holding layer 15B, and a protective layer 18.

<Former>

A corrugated pipe made of stainless steel is used for the former 11. When a hollow former 11 is used, the inside space can function as a flow channel of a coolant (herein, liquid-nitrogen).

<Inner Stress-Relaxation Layer>

The inner stress-relaxation layer 12 is formed by winding around the former 11 a compound tape, PPLP (registered trademark, made by Sumitomo Electric Industries, Ltd.), which is a lamination of kraft paper and polypropylene film. Here, the selection of the material was made in terms of quality and thickness capable of absorbing the radial contraction amount due to cooling of the conductor layer 13 as described in the following. More specifically, the PPLP used in this case had a ratio k of 60%, which is a ratio of the polypropylene film thickness to the total thickness of the compound tape.

<Conductor Layer>

The conductor layer 13 was formed using a Bi-2223-Ag—Mn sheathed tape wire having a thickness of 0.24 mm and a width of 3.8 mm. This tape wire was wound in multiple layers on the inner stress-relaxation layer 12 so as to form the conductor layer 13. In this case, the superconducting wire was wound in four layers.

<Cushion Layer and Lapped-Holding Layer>

The cushion layer 14A was formed on the conductor layer 13 and in addition, the lapped-holding layer 15A was formed on the cushion layer. The cushion layer 14A was formed by winding kraft paper in several layers around the conductor layer, and the lapped-holding layer 15A was formed by winding a copper tape. The cushion layer 14A avoids the direct contact between the metals, i.e., the conductor layer 13 and the lapped-holding layer 15A, whereas the lapped-holding layer 15A tightens, through the cushion layer 14A, the conductor layer in the inward direction of the circumference thereof so that the conductor layer 13 may smoothly undergo the radial contraction due to cooling.

<Insulation Layer and Outer Stress-Relaxation Layer>

An electrical insulation layer 16 is formed on the lapped-holding layer 15A. Here, the insulation layer 16 was formed by PPLP having the ratio k of 60%. This insulation layer 16 has not only a function of electrical insulation for the conductor layer 13 but also a function of the outer stress-relaxation layer for absorbing the radial contraction amount which accompanies the cooling of an outer-conductor layer, which will be described herein later. It is possible to control the increase in the outer diameter of the cable core by making the insulation layer 16 itself to function as the outer stress-relaxation layer, since it is unnecessary to form an outer stress-relaxation layer independently.

Although not illustrated in the figures, an inner semiconductive layer is formed on the inner side of the circumference of the insulation layer, and an outer semiconductive layer is formed on the outer side of the circumferential periphery of the insulation layer. These semiconductive layers were formed by winding carbon paper.

<Outer-Conductor Layer (Return Conductor)>

An outer-conductor layer (return conductor 17) was provided outside the insulation layer 16. In direct current transmission, it is necessary to provide both an outward current flow path and a return current flow path, and therefore in the case of unipolar power transmission, a return conductor 17 is provided and used as the return current flow path. The return conductor 17 is made of the same kind of superconducting wire as the conductor layer 13 and has the same power transmission capacity as the conductor layer 13.

<Cushion Layer and Lapped-Holding Layer>

Subsequently, a cushion layer 14B was formed on the outer-conductor layer, and moreover a lapped-holding layer 15B was formed on the cushion layer. The cushion layer 14B and the lapped-holding layer 15B are composed of the same materials as the cushion layer 14A provided outside the conductor layer 13 and the lapped-holding layer 15A, respectively. The cushion layer 14B avoids the direct contact between the metals, i.e., the return conductor layer 17 and the lapped-holding layer 15B, whereas the lapped-holding layer 15B tightens, through the cushion layer 14B, the return conductor layer 17 in the inward direction of the circumference thereof so that the return conductor layer 17 may smoothly undergo the radial contraction due to cooling.

<Protective Layer>

A protective layer 18 composed of an insulation material is provided outside the return conductor layer 17. In this case, the protective layer 18 is formed by winding kraft paper. With this protective layer 18, it is possible to provide the mechanical protection of the return conductor layer 17 and also to afford insulation from a thermal insulation pipe (inner pipe 21) so as to prevent the return current from flowing partially to the thermal insulation pipe 20.

[Thermal Insulation Pipe]

The thermal insulation pipe 20 is a dual pipe consisting of an inner pipe 21 and an outer pipe 22, and a vacuum thermal insulating layer is provided between these inner and outer pipes 21, 22. A so-called super insulation which is made by laminating a plastic mesh and a metal foil is arranged in the vacuum thermal insulating layer. The space formed between the inner wall face of the inner pipe 21 and the core 10 becomes a channel of a coolant. An anticorrosion layer 23 made of polyvinyl chloride or the like may be formed according to need on the outer periphery of the thermal insulation pipe 20.

Embodiment 1

Designing System of the Present Invention

Figure 2:
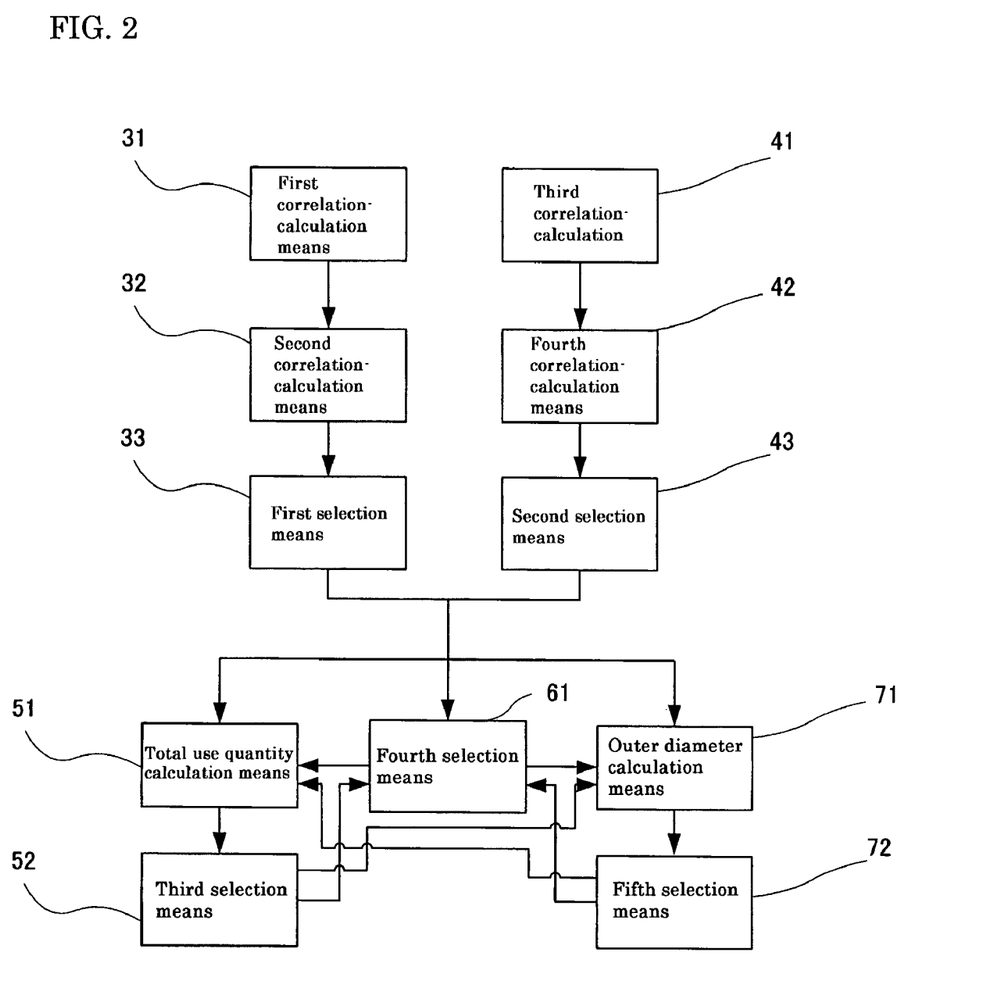
FIG. 2 is a functional block diagram regarding the system of the present invention.

In one embodiment, the system of the present invention includes First correlation-calculation means 31, Second correlation-calculation means 32, and First selection means 33 as shown in the functional block diagram of FIG. 2, and these means extract data regarding the winding diameter and the winding pitch of a superconducting wire which is to constitute a conductor layer.

In another embodiment, the system of the present invention includes Third correlation-calculation means 41, Fourth correlation-calculation means 42, and Second selection means 43, and these means extract data regarding the winding diameter and the winding pitch of a superconducting wire which is to constitute an outer-conductor layer.

In further embodiments, Third selection means 52 extracts data regarding the winding diameter and the winding pitch of a superconducting wire which make it possible to reduce the use quantity of the superconducting wire which is equivalent for an excessive specification; Fourth selection means 61 extracts data in which the number of layers of superconducting wire in the conductor layer and that of the outer-conductor layer are equal to or less than a given value, respectively; and Fifth selection means 72 extracts data in which the outer conductor diameter is the smallest. The extraction of data by Third selection means 52, Fourth selection means 61, and Fifth selection means 72 can be performed using either one of these means independently or a plural number of the means in combination.

First correlation-calculation means 31 calculates the relationship between the ratio $Xf$, which is a ratio between the winding diameter and the winding pitch of a superconducting wire to constitute a conductor layer, and the radial contraction amount $Cf$, which will accompany the cooling of the superconducting wire. The winding diameter is set at suitable intervals in the range of 20 to 40 mm. The winding pitch is set at suitable intervals in the range of 2 to 20 times this winding diameter. The radial contraction amount $Cf$, which absorbs the thermal contraction due to cooling of a superconducting wire, is a value obtained by seeking how much the superconducting wire will contract in a radial direction when the superconducting wire which has been wound with a certain winding diameter and winding pitch contracts in the longitudinal direction due to the cooling. The longitudinal contraction ratio of a superconducting wire can be obtained from the coefficient of linear expansion of the superconducting wire and the amount of temperature variation due to the cooling. In this case, the contraction ratio is 0.3%. The amount of contraction in a radial direction, i.e., the radial contraction amount, can be calculated using the above-mentioned contraction ratio and the fact that when one pitch of a spirally arranged superconducting wire is spread, it can be expressed with a right-angled triangle, wherein the length of the superconducting wire is the oblique line, the circumferential length is the vertical line, and the pitch is the base line.

Second correlation-calculation means 32 calculates the relationship between the ratio $Xf$ and the use quantity ratio $Ufx$ of the superconducting wire in the conductor layer per unit length of the cable. The use quantity ratio $Ufx$ of the superconducting wire in the conductor layer per unit length of the cable is not a value in which the necessary wire quantity $Sf$ obtained from the line characteristics such as electric current capacity is considered, but is a value in which a consideration is given to the required quantity $fu$ of the wire which is actually needed for forming a conductor layer in a unit length of the cable. The necessary wire quantity $Sf$ is a wire use quantity in the case where a superconducting wire that is needed to secure a predetermined electric current capacity is applied in a longitudinal direction on a chosen winding diameter.

On the other hand, if the winding diameter and the winding pitch for forming a conductor layer are decided, it is possible to seek the number of layers and the thickness of the conductor layer in the case of winding the necessary wire quantity of a superconducting wire in order to constitute the conductor layer according to such conditions, since the width and thickness of the superconducting wire are known. In such case, if the whole circumference of the outermost layer is covered with the superconducting wire, the necessary wire quantity $Sf$ becomes equal to the actual use quantity $fu$. And if such is not the case, the wire quantity with which the whole outermost layer would be covered with the superconducting wire is regarded as the actual use quantity $fu$ of the superconducting wire. Then, the above-mentioned use quantity ratio $Ufx$ of the superconducting wire is expressed by $fu/Sf$, i.e., the ratio of the actual wire use quantity to the necessary use quantity.

Based on the calculation results of the above-mentioned First correlation-calculation means 31 and Second correlation-calculation means 32, First selection means 33 extracts the data regarding the winding diameter and the winding pitch of the superconducting wire that will satisfy a given radial contraction amount $Cfs$ and the use quantity ratio $Ufxs$ of the superconducting wire. In this case, the radial contraction amount $Cfs$ is 0.4 mm, and the use quantity ratio $Ufxs$ is 1.2.

Third correlation-calculation means 41, Fourth correlation-calculation means 42, and Second selection means 43, in which the above-mentioned method of extracting the winding diameter and the winding pitch for a conductor layer is applied to the outer-conductor layer, are, in the basic way of thinking, the same as First correlation-calculation means 31, Second correlation-calculation means 32, and First selection means 33. That is, Third correlation-calculation means 41 calculates the relationship between the ratio $Xg$, which is a ratio between the winding diameter of the conductor layer and the winding pitch, and the radial contraction amount $Cg$ which will accompany the cooling of the superconducting wire. And, Fourth correlation-calculation means 42 calculates the relationship between the ratio $Xg$ and the use quantity ratio $Ufg$ of the superconducting wire in the outer-conductor layer per unit length of the cable.

However, in this case, a value obtained based on the outer diameter of the conductor layer is adopted as the winding diameter. Since a cushion layer, a lapped-holding layer, and an insulation layer are formed in order on the conductor layer, the winding diameter of the outer-conductor layer is determined by adding their respective thickness to the outer diameter of the conductor layer. It is possible to calculate the values to be set with respect to the thickness of a cushion layer and a lapped-holding layer, and the thickness of an insulation layer, according to the line conditions such as voltage and the insulation characteristics of the insulation material which constitutes the insulation layer.

On the other hand, as in the case of the use quantity ratio $Ufx$ in the conductor layer, the use quantity ratio $Ufg$ is not the necessary wire quantity $Sg$ obtained from the line characteristics such as electric current capacity and the like, but is a value determined by considering the wire quantity $gu$ which is actually needed for forming an outer-conductor layer in a unit length of the cable. In such case, the electric current capacity of the outer-conductor layer is the same as that of the conductor layer, and the method of obtaining the use quantity ratio $Ufg$ is the same as in the case of the use quantity ratio $Ufx$.

Then, using Second selection means 43, the data of the winding diameter and the winding pitch of the superconducting wire that satisfies a given radial contraction amount $Cgs$ and the use quantity ratio $Ufgs$ of the superconducting wire are extracted from the calculation results of Third correlation-calculation means 41 and Fourth correlation-calculation means 42. Here, the radial contraction amount Cgs is 0.4 mm, and the use quantity ratio Ufgs is 1.2.

Third selection means 52, Fourth selection means 61, and Fifth selection means 72 are the compositions for further narrowing down the extraction results of First selection means 33 and Second selection means 43.

Prior to a judgment to be made with Third selection means 52, a calculation is performed by means of Total use quantity calculation means 51. Total use quantity calculation means 51 calculates the total use quantity fu+gu, in which fu is the use quantity of the superconducting wire in the conductor layer and gu is the use quantity of the superconducting wire in the outer-conductor layer, and also the total use quantity ratio Utx=(fu+gu/Sf+Sg) from the total quantity Sf+Sg of necessary wires. Then, the data in which the total use quantity ratio Utx is equal to or less than a given value is extracted using Third selection means 52.

Fourth selection means 61 extracts, out of the data extracted with First selection means 33 and Second selection means 43, the winding diameter and winding pitch that will achieve a number of layers that is equal to or less than the predetermined maximum number H of layers in the conductor layer and the outer-conductor layer, respectively.

A calculation is performed with Outer diameter calculation means 71 before the judgment by means of Fifth selection means 72 is conducted. Outer diameter calculation means 71 seek the outer diameter of the outer-conductor layer. More specifically, since the number of layers of a superconducting wire to constitute the outer-conductor layer is found with Fourth correlation-calculation means 42, the outer diameter of the outer-conductor layer can be sought from the thickness and the number of layers of a superconducting wire. Based on the calculation results of Outer diameter calculation means 71, Fifth selection means 72 extracts the data in which the outer diameter of the outer-conductor layer is the smallest.

[Operating Procedures of the Designing System of the Present Invention]

Figure 3:
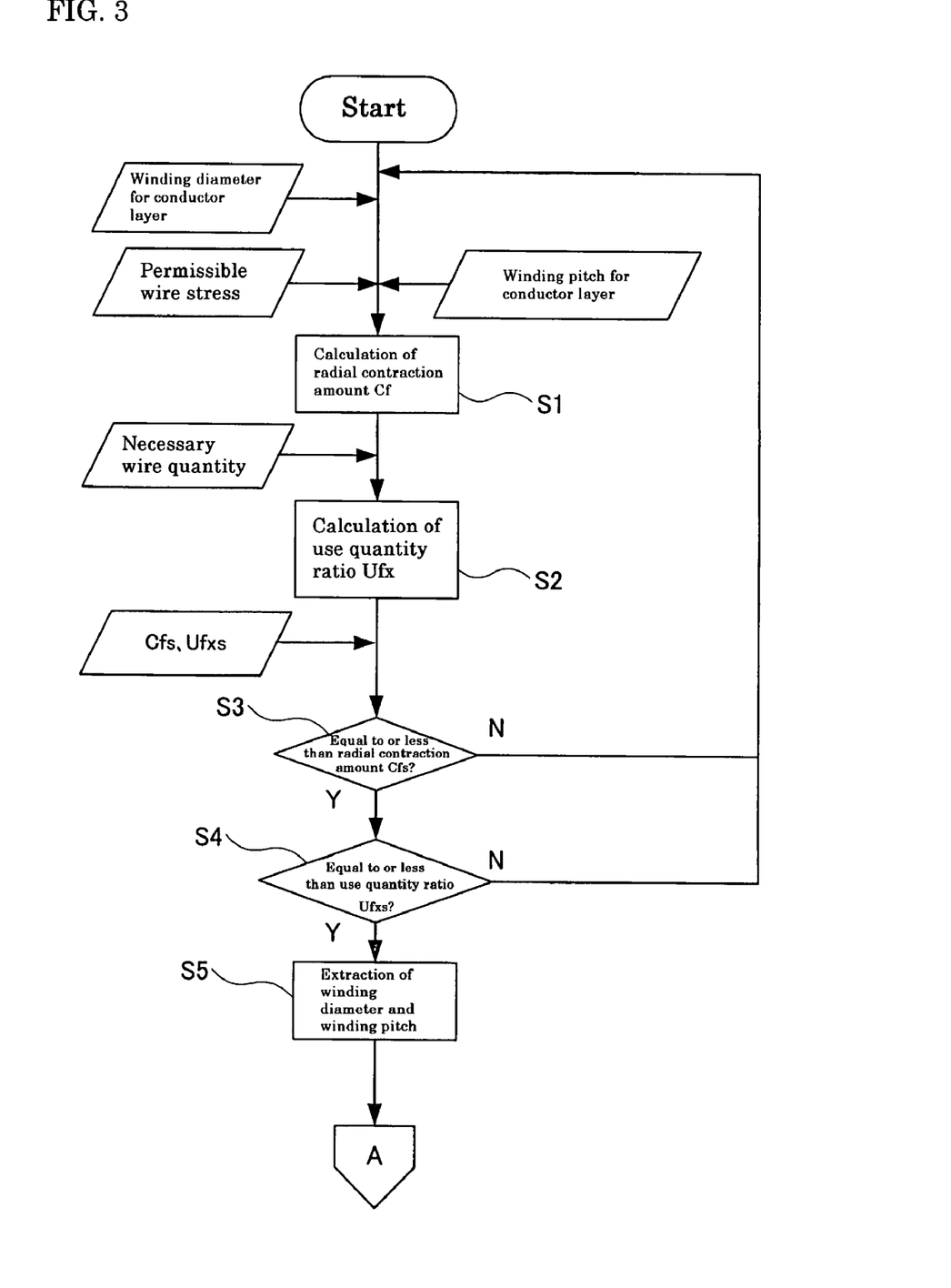
FIG. 3 is a flow chart showing the foregoing part of processing procedures in Embodiment 1 according to the system of the present invention.
Figure 4:
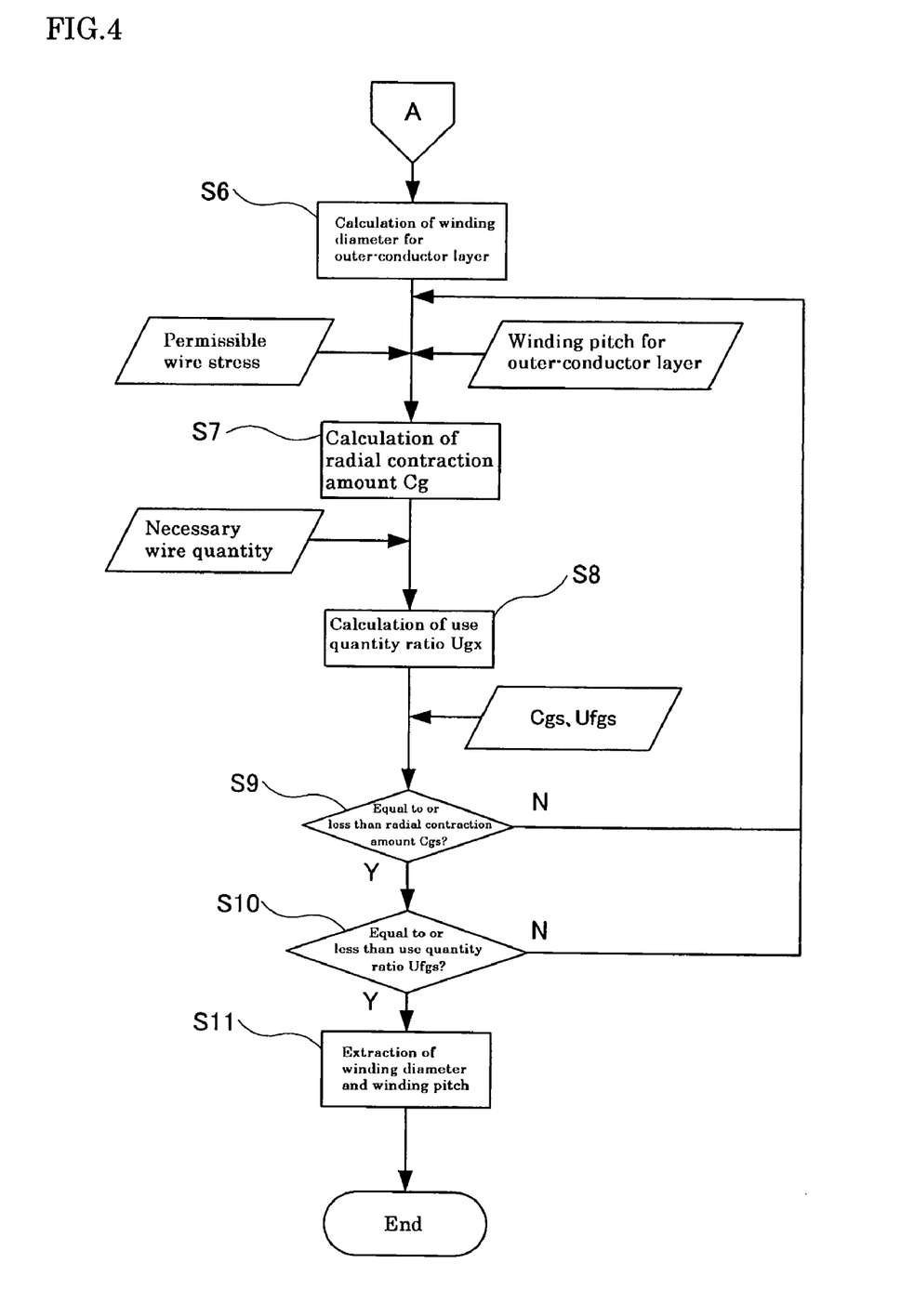
FIG. 4 is a flow chart showing the latter part of the processing procedures in Embodiment 1 according to the system of the present invention.

Next, the operating procedures of the above system are described based on the flow charts of FIGS. 3 and 4. In such case, each part of the system of the present invention is referred to the functional block diagram of FIG. 2.

First, as shown in FIG. 3, the winding diameter and the winding pitch for a conductor layer and a permissible wire stress at a time of cooling are set, and the radial contraction amount Cf of the superconducting wire under such conditions is calculated (Step S1). As for the permissible wire stress at a time of cooling, a ratio is set as to whether the superconducting wire should not be caused to suffer from the wire stress at a time of cooling or a certain permissible amount of tensile stress be allowed to act on the superconducting wire, only some degree of the thermal contraction due to the cooling being absorbed. By this calculation, the relationship between the ratio Xf, which is the ratio between the winding diameter and the winding pitch of the superconducting wire to constitute a conductor layer, and the radial contraction amount Cf which will accompany the cooling of the superconducting wire.

Next, the necessary wire quantity of the superconducting wire to constitute a conductor layer and the use quantity ratio Ufx under such condition is calculated (Step S2). By this calculation, the relationship between the ratio Xf and the use quantity ratio Ufx of the superconducting wire in the conductor layer per unit length of the cable is calculated.

Subsequently, judgment is made as to whether or not the radial contraction amount Cf is equal to or less than the given radial contraction amount Cfs (0.4 mm) (Step S3), and if such is the case, the following step S4 is conducted, and if such is not the case, then Step S1 and Step S2 are repeated by setting once again a different winding diameter, winding pitch, and wire stress permissible at a time of cooling.

In step S4, the use quantity ratio Ufx of the superconducting wire is judged whether it is equal to or less than the given use quantity ratio Ufxs (1.2), and if it is positive, then the winding diameter and the winding pitch with which use quantity ratio Ufx becomes equal to or less than 1.2 and the radial contraction amount Cf becomes equal to or less than 0.4 mm are extracted as the data (Step S5). If the use quantity ratio Ufx of the superconducting wire is not equal to or less than 1.2, then Step S1, Step S2, and Step S3 are repeated by setting once again a different winding diameter, winding pitch, and wire stress permissible at a time of cooling.

Next, as shown in FIG. 4, the winding diameter for the outer-conductor layer is calculated on the basis of the result of the conductor layer composition as extracted in Step S5 (Step S6).

Subsequently, a winding pitch of the outer-conductor layer is set, and the radial contraction amount Cg is calculated with the winding pitch and the winding diameter obtained as described above (Step S7). According to such calculation, a calculation is done regarding the relationship between the ratio Xg, which is the ratio between the winding diameter and the winding pitch of the superconducting wire to constitute the outer-conductor layer, and the radial contraction amount Cg which will accompany the cooling of the superconducting wire.

Next, the relationship between the ratio Xg and the use quantity ratio Ufg of the superconducting wire in the outer-conductor layer per unit length of the cable is calculated (Step S8).

Subsequently, the radial contraction amount Cg of the superconducting wire is judged whether it is equal to or less than the radial contraction amount Cgs (0.4 mm) (Step S9), and if so, then the use quantity ratio Ugx is judged whether it is equal to or less than the use quantity ratio Ufgs (1.2) (Step S10). If these conditions are satisfied, the winding diameter and the winding pitch of the superconducting wire are extracted as the data. In contrast, if the radial contraction amount Cg and the use quantity ratio Ugx are more than the given values, then the winding pitch of the outer-conductor layer is changed, and Step S7 and Step S8 are repeated once again.

Embodiment 2

Figure 5:
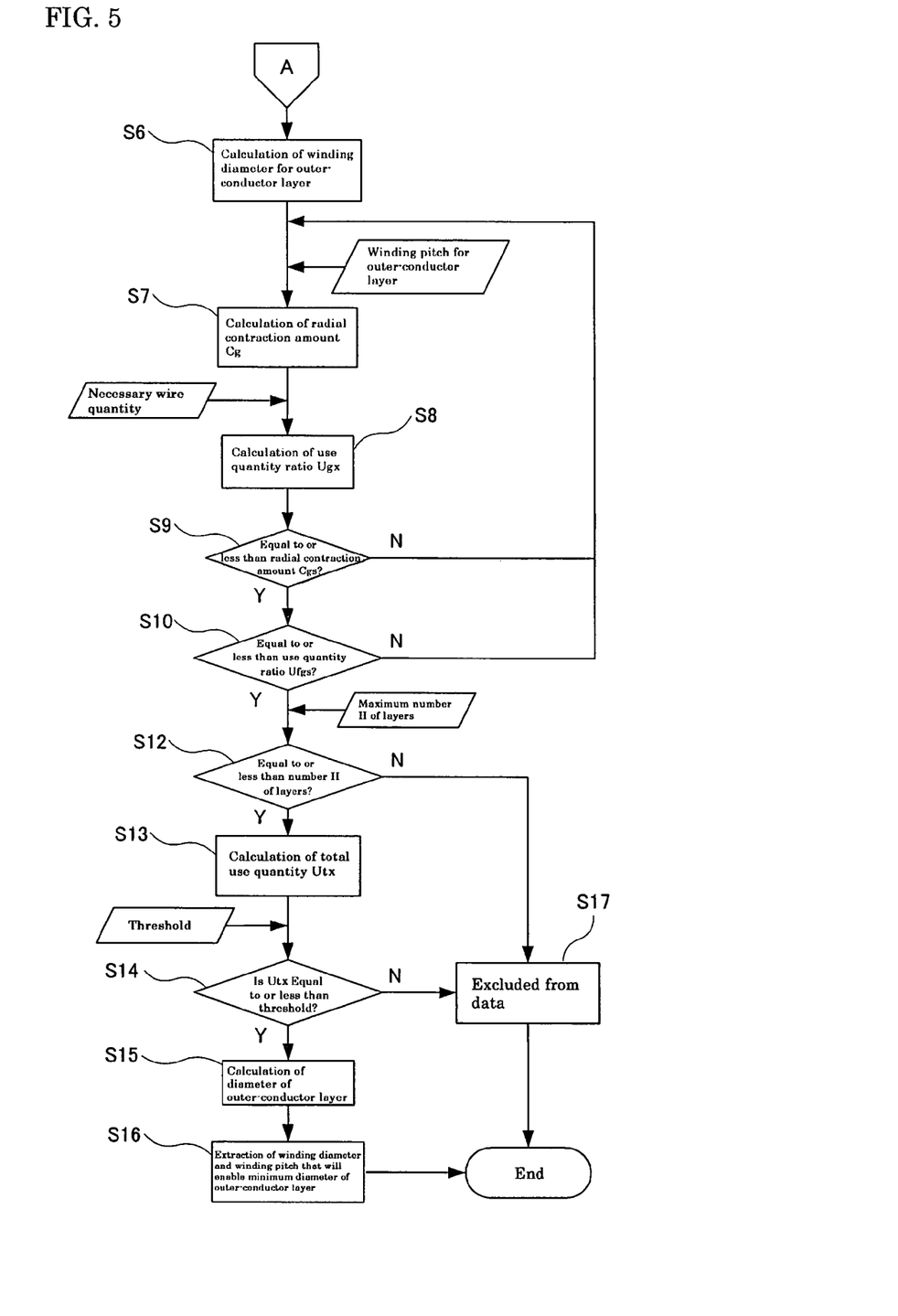
FIG. 5 is a flow chart showing the latter part of processing procedures in Embodiment 2 according to the system of the present invention.

In the above embodiment, the processing ends at the point when data are obtained from the results of extraction by First selection means 33 and Second selection means 43. However, Third selection means 52, Fourth selection means 61, and Fifth selection means 72 may be used. The flow chart of such embodiment is shown in FIG. 5. Since the processing procedures up to Step S10 are the same as the above-mentioned Embodiment 1, the processing procedures following thereafter will be described.

In this example, in the case where the use quantity ratio Ugx is equal to or less than the given use quantity ratio Ufgs (1.2) in Step S10, a judgment is made as to whether the number of layers of the conductor layer and that of the outer-conductor layer are equal to or less than the maximum number H of layers, respectively (Step S12). If the respective number of layers of the conductor layer and the outer-conductor layer is equal to or less than the maximum number H of layers as a result of such judgment, the following Step S13 is executed, and if it is not positive, then the data is excluded, without adopting for the object of extraction (Step S17).

In Step S13, the use quantity ratio Utx of the superconducting wire is calculated, and in Step S14, the judgment is done whether the total use quantity ratio Utx of the superconducting wire is equal to or less than the given value.

If the Utx is equal to or less than the given value as a result of such judgment, the outer diameter of the outer-conductor layer is calculated in Step S15, and if such is not the case, then the data is excluded, without adopting for the object of extraction (Step S17).

Then, data are extracted regarding the winding diameter and the winding pitch with which the outer diameter of the outer-conductor layer will become the smallest (Step 16).

[Examples of Trial Calculation]

The following trial calculations were performed using above-mentioned system so that the use quantity of the superconducting wire could be decreased while aiming at shortening the pitch of the superconducting wire so as to reduce the radial contraction amount.

Figure 6:
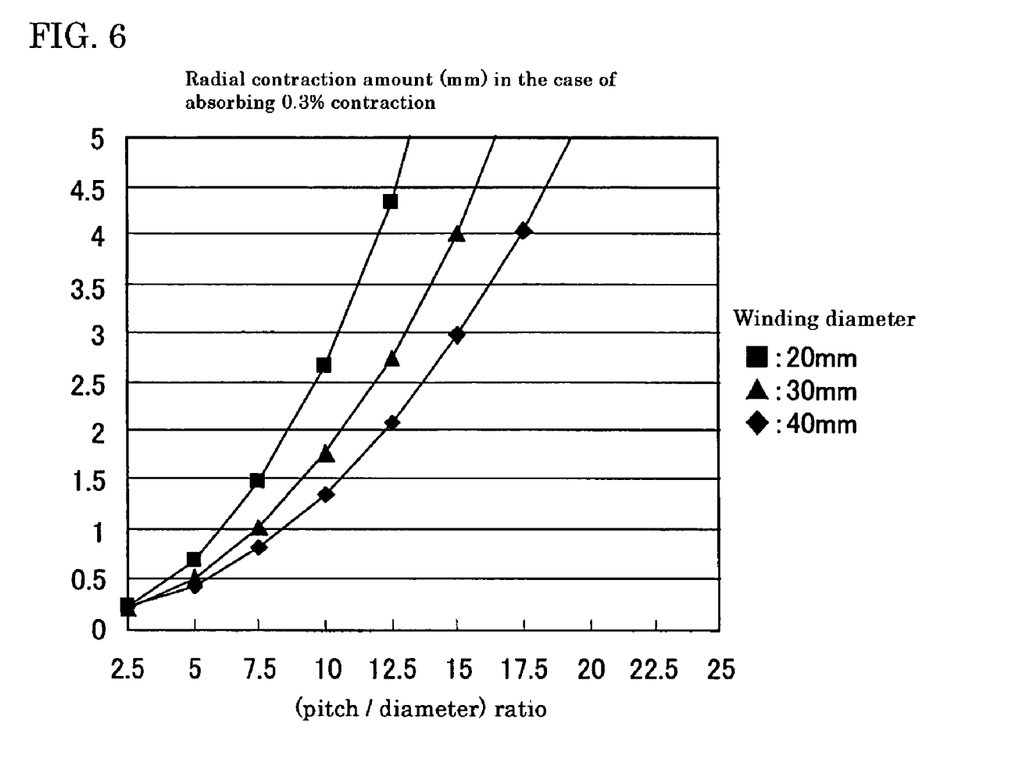
FIG. 6 is a graph showing the relationship between "(pitch/diameter) ratio" and the radial contraction amount of superconducting wires at the time of cooling.

First examined was the relationship between "(pitch/diameter) ratio", which is a ratio between the winding pitch and the winding diameter of the superconducting wire to constitute a superconducting layer, and the radial contraction amount of the superconducting wire. In this example, three winding diameters of 20 mm$\phi$, 30 mm$\phi$, and 40 mm$\phi$ were adopted, and with respect to each of those diameters, trial calculations were performed using the linear expansion coefficient of each material regarding "(pitch/diameter) ratio" and the radial contraction amount in the case where the superconducting wire contracts by 0.3% as a result of cooling during operation. The results are shown in the graph of FIG. 6.

As shown in this graph, if the (pitch/diameter) ratio is the same, the greater the winding diameter, the smaller the radial contraction amount is. Also, it can be seen that if the winding diameter is the same, the smaller the (pitch/diameter) ratio, the less the radial contraction amount is. From such results, it is understood that choosing a smaller pitch helps to reduce the radial contraction amount to be absorbed.

Figure 7:
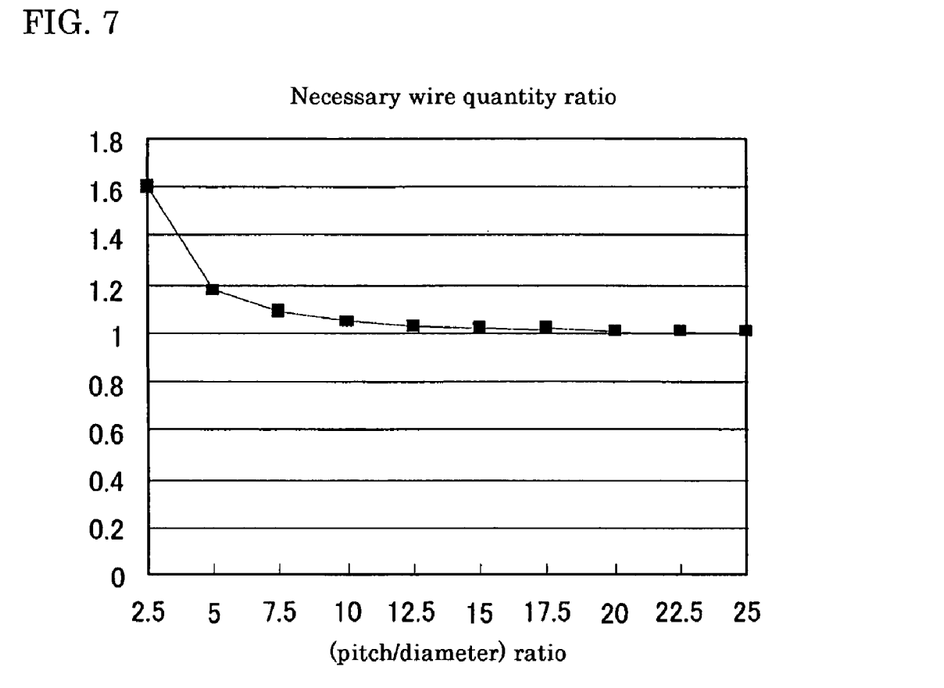
FIG. 7 is a graph showing relationship between "(pitch/diameter) ratio" and the use quantity of superconducting wires.

Next, the relationship between the (pitch/diameter) ratio and the use quantity of the superconducting wire was examined. Here, the use quantity of a superconducting wire is defined as 1.0 in the case where the superconducting wire is arranged longitudinally, i.e., applied along an object around which the superconducting wire is to be wound. Thus, the relative values of change according to variation in the (pitch/diameter) ratio were shown with respect to the use quantity of the superconducting wire. The results are shown in the graph of FIG. 7.

As can be seen in this graph, the use quantity of the superconducting wire does not increase significantly in an area where the (pitch/diameter) ratio is about 6.0 or more, but the use quantity of the superconducting wire sharply increases from the point where the ratio is less than about 4.0.

From the results of the above-described two trial calculations, it is understood that a (pitch/diameter) ratio in the range of about 4.0 to 6.0 is suitable if the use quantity of the superconducting wire is to be lessened and at the same time the contraction of the superconducting wire is to be easily absorbed in the case of cooling.

Table I is a summary of the materials and the sizes of the structural members of a superconducting cable (50 kV, 10000 A) designed based on those trial calculation results described above. The winding pitch of the superconducting wire in the conductor layer and the outer-conductor layer is 5 times the winding diameter, respectively. In other words, the winding pitch of the conductor layer is 210 mm, and that of the outer-conductor layer is about 274 mm.

TABLE I

| Structural members | Materials | Outer diameter (mm), etc. |
|---|---|---|
| Former | Stainless corrugated pipe | 30 |
| Inner stress-relaxation layer | PPLP | 42 (thickness: 6 mm) |
| Conductor layer | Bi2223 superconducting wire | 46.4 (4 layers) |
| Cushion layer/lapped-holding layer | Kraft paper/cupper tape | 47.4 |
| Insulation layer and outer stress-relaxation layer | PPLP | 54.7 (thickness: 3 mm) |
| Outer-conductor layer | Bi2223 superconducting wire | 57.5 (3 layers) |
| Cushion layer/lapped-holding layer | Kraft paper/cupper tape | 59.5 |
| Protective layer | Kraft paper | 61.7 (thickness: 1 mm) |
| Outer diameter of cable | — | 116 |

In the composition described in Table 1, the former itself also is caused to radially contract by cooling. When the contraction ratio in the case of the cooling is assumed to be 0.3%, the radial contraction amount of the former becomes 0.09 mm. On the other hand, the radial contraction amount of the superconducting wire according to the contraction ratio of 0.3% under the conditions of winding diameter of 42 mm and winding pitch of 210 mm is 0.45 mm. Therefore, apparently the radial contraction amount of the former can absorb 20% of the radial contraction amount of the conductor layer. Accordingly, it is understood that if the radial contraction amount of the inner stress-relaxation layer is 0.36 mm, the total radial contraction amount of the former and the inner stress-relaxation layer can absorb 100% of the radial contraction amount of the conductor layer. Thus, if the inner stress-relaxation layer exhibiting the radial contraction amount of 0.45 mm is formed, all of the radial contraction amount of the conductor layer can be absorbed only with the inner stress relaxation layer.

INDUSTRIAL APPLICABILITY

The designing system of the present invention for designing a DC superconducting cable can be used in a field where DC superconducting cables for the direct current electric power transportation means are designed.

The invention claimed is:

1. A method of computation for designing a DC superconducting cable comprising a conductor layer, an outer-conductor layer arranged outside the conductor layer through an electrical insulation layer, and an inner stress-relaxation layer inside the conductor layer, the method being capable of calculating a winding diameter and a winding pitch of superconducting wires to constitute the conductor layer and the outer-conductor layer, the method of computation comprising:

a: calculating the relationship between a ratio Xf and a contraction amount Cf, the ratio Xf being a ratio between the winding diameter and the winding pitch of a superconducting wire constituting the conductor layer, and the contraction amount Cf being capable of absorbing the thermal contraction of the superconducting wire due to cooling;

b: calculating the relationship between the ratio Xf and a use quantity ratio Ufx of the superconducting wire in the conductor layer per unit length of the cable; and c: extracting, from the calculation results of a and b, data of the winding diameter and the winding pitch of the superconducting wire, the data enabling satisfying a given contraction amount Cfs and the use quantity ratio Ufxs of the superconducting wire.

2. A method of computation for designing a DC superconducting cable as set forth in claim 1, further comprising:

calculating the relationship between a ratio Xg and a radial contraction amount Cg due to cooling of a superconducting wire, said ratio Xg being the relationship between a winding diameter and a winding pitch of the superconducting wire to constitute an outer-conductor layer, wherein the winding diameter is calculated using the thickness of the insulation layer according to line conditions and the outer diameter of the conductor layer based on the extraction result;

calculating the relationship between said ratio Xg and a use quantity ratio Ufg of the superconducting wire in the outer-conductor layer per unit length of the cable; and extracting, from these calculation results, data of the winding diameter and the winding pitch of the superconducting wire that satisfy a predetermined radial contraction amount Cgs and use quantity ratio Ufgs of the superconducting wire.

3. A method of computation for designing a DC superconducting cable as set forth in claim 2, further comprising:

calculating a total use quantity tu, said tu being the total amount of the use quantity fu of the superconducting wire in the conductor layer and the use quantity gu of the superconducting wire in the outer-conductor layer; and calculating a total use quantity ratio Utx by seeking the total use quantity tu, said tu being the total amount of the use quantity fu of the superconducting wire in the conductor layer and the use quantity gu of the superconducting wire in the outer-conductor layer, said Utx being the ratio between said total use quantity tu and the total amount Sf+Sg of necessary wires, and extracting, out of the data extracted, the data of the ratio Utx that is equal to or less than a given value.

4. A method of computation for designing a DC superconducting cable as set forth in claim 2, further comprising extracting, out of the data extracted, wherein the number of layers in the conductor layer and the outer-conductor layer is equal to or less than a predetermined maximum number H of layers, respectively.

5. A method of computation for designing a DC superconducting cable as set forth in claim 2, further comprising:

calculating the outer diameter of the outer-conductor layer in a cable designed according to the data extracted; and extracting, out of the data extracted, the data of the minimum outer diameter of the outer-conductor layer.

\* \* \* \* \*